(12) United States Patent
Wei

(10) Patent No.: US 11,095,460 B2
(45) Date of Patent: Aug. 17, 2021

(54) CERTIFICATE APPLICATION OPERATIONS

(71) Applicant: Advanced New Technologies Co., Ltd., George Town (KY)

(72) Inventor: Yawen Wei, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/815,907

(22) Filed: Mar. 11, 2020

(65) Prior Publication Data
US 2021/0006418 A1 Jan. 7, 2021

Related U.S. Application Data

(63) Continuation of application No. PCT/CN2020/071556, filed on Jan. 11, 2020.

(30) Foreign Application Priority Data

Jul. 5, 2019 (CN) .......................... 201910604675.X

(51) Int. Cl.
*H04L 29/06* (2006.01)
*H04L 9/32* (2006.01)
*H04L 9/30* (2006.01)

(52) U.S. Cl.
CPC .......... *H04L 9/3268* (2013.01); *H04L 9/3073* (2013.01); *H04L 9/3247* (2013.01)

(58) Field of Classification Search
CPC ... H04L 63/10; H04L 63/102; H04L 63/0823; H04L 9/3268; H04L 9/3073;
(Continued)

(56) References Cited

U.S. PATENT DOCUMENTS 6,826,690 B1 * 11/2004 Hind ................. G06F 21/31
713/173
8,250,361 B2 8/2012 Kido et al.
(Continued)

FOREIGN PATENT DOCUMENTS

CN 101345723 1/2009
CN 101477661 7/2009
(Continued)

OTHER PUBLICATIONS

Krishna Shingala, "JSON Web Token (JWT) based client authentication in Message Queuing Telemetry Transport (MQTT)" (Aug. 2018).*

(Continued)

*Primary Examiner* — Samson B Lemma
(74) *Attorney, Agent, or Firm* — Fish & Richardson P.C.

(57) ABSTRACT

Implementations of this disclosure provide for certificate application operations. An example method includes sending, from a terminal device, a subscription topic name to a gateway to establish a data transmission channel between the terminal device and the gateway; receiving by the terminal device, via the data transmission channel, a certificate installation instruction from a certificate server; generating, by the terminal device, a user certificate request based on the certificate installation instruction; sending the user certificate request to the certificate server; and receiving, via the data transmission channel, a user certificate from the certificate server.

21 Claims, 8 Drawing Sheets

(58) Field of Classification Search
CPC ............ H04L 9/3247; H04W 12/0609; H04W 12/00503; H04W 12/00512; H04W 12/00514; H04W 12/06; H04W 12/08; H04W 12/50
USPC ........................................................ 713/156
See application file for complete search history.

(56) References Cited

U.S. PATENT DOCUMENTS

| | | | |
|---|---|---|---|
| 10,178,550 B2 | 1/2019 | Lee et al. | |
| 10,243,748 B1 | 3/2019 | Callan et al. | |
| 10,382,213 B1* | 8/2019 | Rafn | H04L 9/3268 |
| 10,425,392 B2 | 9/2019 | Tal et al. | |
| 10,601,823 B2* | 3/2020 | Trivelpiece | H04W 12/04 |
| 2004/0103283 A1* | 5/2004 | Hornak | H04L 63/166 |
| | | | 713/175 |
| 2005/0076203 A1* | 4/2005 | Thornton | H04L 9/3271 |
| | | | 713/156 |
| 2008/0181379 A1 | 7/2008 | Chow et al. | |
| 2013/0061055 A1* | 3/2013 | Schibuk | G06Q 20/223 |
| | | | 713/172 |
| 2016/0338102 A1 | 11/2016 | Nuggehalli et al. | |
| 2018/0213378 A1 | 7/2018 | Brown | |
| 2020/0021586 A1* | 1/2020 | Schmidt | H04L 12/66 |

FOREIGN PATENT DOCUMENTS

| | | | | |
|---|---|---|---|---|
| CN | 102685749 | | 9/2012 | |
| CN | 104426895 | | 3/2015 | |
| CN | 105284091 | | 1/2016 | |
| CN | 105376589 | | 3/2016 | |
| CN | 105453621 | | 3/2016 | |
| CN | 101925920 | | 9/2016 | |
| CN | 106250173 | | 12/2016 | |
| CN | 106302391 | | 1/2017 | |
| CN | 108141448 | | 6/2018 | |
| CN | 108599939 | | 9/2018 | |
| CN | 108650212 A | * | 10/2018 | |
| CN | 108833105 | | 11/2018 | |
| CN | 109587228 | | 4/2019 | |
| CN | 109861978 | | 6/2019 | |
| CN | 110445614 | | 11/2019 | |
| GB | 2359969 A | * | 9/2001 | ............ G06F 21/31 |

OTHER PUBLICATIONS

Crosby et al., "BlockChain Technology: Beyond Bitcoin," Sutardja Center for Entrepreneurship & Technology Technica Report, Oct. 16, 2015, 35 pages.

Nakamoto, "Bitcoin: A Peer-to-Peer Electronic Cash System," www.bitcoin.org, 2005, 9 pages.

PCT International Search Report and Written Opinion in International Application No. PCT/CN2020/071556, dated Apr. 1, 2020, 19 pages.

* cited by examiner

CERTIFICATE APPLICATION OPERATIONS

CROSS-REFERENCE TO RELATED APPLICATIONS

This application is a continuation of PCT Application No. PCT/CN2020/071556, filed on Jan. 11, 2020, which claims priority to Chinese Patent Application No. 201910604675.X, filed on Jul. 5, 2019, and each application is hereby incorporated by reference in its entirety.

TECHNICAL FIELD

The present specification relates to the field of computer technologies, and in particular, to certificate application methods and apparatuses, terminal devices, gateway devices, and servers.

BACKGROUND

As an authoritative electronic document, a digital certificate can be used to prove an identity of an agent (such as a person or a server) that performs information exchange and business activities in a network environment. Due to its tamper-resistance and non-repudiation, the digital certificate can be widely applied to application scenarios of data encryption, network finance, network government affairs, and other data services to check validity of interaction information between parties.

The digital certificate is stored in a local device. A browser can be used to call the locally stored digital certificate when a data service is processed by using the browser and interaction information needs to be checked. Continuous upgrade of browser technologies and diversity of browsers and operating systems impose a higher requirement on stability of a communication channel between the local device and the browser.

SUMMARY

Implementations of the present specification provide certificate application methods and apparatuses, terminal devices, gateway devices, and servers. The servers can transmit data to devices by using data transmission channels between gateways and the devices. Data transmission processes are independent of controls used by browsers, so as to implement decoupling from browser compatibility.

According to a first aspect, an implementation of the present specification provides a certificate application method, including: receiving a certificate installation instruction from a certificate server by using a data transmission channel between the terminal device and a gateway, where the data transmission channel is a channel established based on a subscription topic name sent by the terminal device to the gateway; generating a user certificate request based on the certificate installation instruction, and sending the user certificate request to the certificate server; and receiving, by using the data transmission channel, a user certificate delivered by the certificate server.

According to a second aspect, an implementation of the present specification provides a certificate application apparatus, including: a certificate installation instruction receiving module, configured to receive a certificate installation instruction from a certificate server by using a data transmission channel between a terminal device and a gateway, where the data transmission channel is a channel established based on a subscription topic name sent by the terminal device to the gateway; a user certificate request sending module, configured to generate a user certificate request based on the certificate installation instruction, and send the user certificate request to the certificate server; and a user certificate receiving module, configured to receive, by using the data transmission channel, a user certificate delivered by the certificate server.

According to a third aspect, an implementation of the present specification provides a terminal device, including a memory and a processor, where the memory is configured to store a program; and the processor is configured to read executable program code stored in the memory to execute the certificate application method in the first aspect.

According to a fourth aspect, an implementation of the present specification provides a certificate application method, including: receiving message data from a certificate server, where the message data includes a certificate installation instruction, a user certificate, or a user certificate signing instruction; determining a subscription topic name corresponding to the message data, and selecting a data transmission channel corresponding to the subscription topic name, where the data transmission channel is a channel established based on the subscription topic name sent by a terminal device to the gateway; and sending the message data by using the data transmission channel.

According to a fifth aspect, an implementation of the present specification provides a certificate application apparatus, including: a message data receiving module, configured to receive message data from a certificate server, where the message data includes a certificate installation instruction, a user certificate, or a user certificate signing instruction; a data transmission channel selection module, configured to determine a subscription topic name corresponding to the message data, and select a data transmission channel corresponding to the subscription topic name, where the data transmission channel is a channel established based on the subscription topic name sent by a terminal device to a gateway; and a message data sending module, configured to send the message data by using the data transmission channel.

According to a sixth aspect, an implementation of the present specification provides a gateway device, including: a memory and a processor, where the memory is configured to store a program; and the processor is configured to read executable program code stored in the memory to execute the certificate application method in the fourth aspect.

According to a seventh aspect, an implementation of the present specification provides a certificate application method, including: sending a certificate installation instruction to a gateway that pre-establishes a link, so that the gateway sends the certificate installation instruction to a terminal device by using a data transmission channel between the gateway and the terminal device, where the data transmission channel is a channel established based on a subscription topic name sent by the terminal device to the gateway, and message data corresponding to the subscription topic name includes the certificate installation instruction; receiving a user certificate registration request corresponding to the certificate installation instruction, and applying for a user certificate based on the user certificate registration request; and sending the user certificate obtained through application to the gateway, so that the gateway sends the user certificate to the terminal device by using the data transmission channel.

According to an eighth aspect, an implementation of the present specification provides a certificate application apparatus, including: a certificate installation instruction sending module, configured to send a certificate installation instruction to a gateway that pre-establishes a link, so that the gateway sends the certificate installation instruction to a terminal device by using a data transmission channel between the gateway and the terminal device, where the data transmission channel is a channel established based on a subscription topic name sent by the terminal device to the gateway, and message data corresponding to the subscription topic name includes the certificate installation instruction; a user certificate application module, configured to receive a user certificate registration request corresponding to the certificate installation instruction, and apply a user certificate based on the user certificate registration request; and a user certificate sending module, configured to send the user certificate obtained through application to the gateway, so that the gateway sends the user certificate to the terminal device by using the data transmission channel.

According to a ninth aspect, an implementation of the present specification provides a certificate server, including: a memory and a processor, where the memory is configured to store a program; and the processor is configured to read executable program code stored in the memory to execute the certificate application method in the seventh aspect.

Based on the certificate application methods and apparatuses, the terminal devices, the gateway devices, and the servers that are provided by the implementations of the present specification, the certificate server can push an instruction and a digital certificate obtained through application to a terminal device by using a data transmission channel between a gateway and the terminal device. A data transmission process is independent of controls used by a browser, so as to implement decoupling from browser compatibility.

BRIEF DESCRIPTION OF DRAWINGS

To describe the technical solutions in the implementations of the present specification more clearly, the following briefly describes the accompanying drawings needed in the implementations of the present specification. A person of ordinary skill in the art can still derive other drawings from these accompanying drawings without creative efforts.

DESCRIPTION OF IMPLEMENTATIONS

Figure 1:
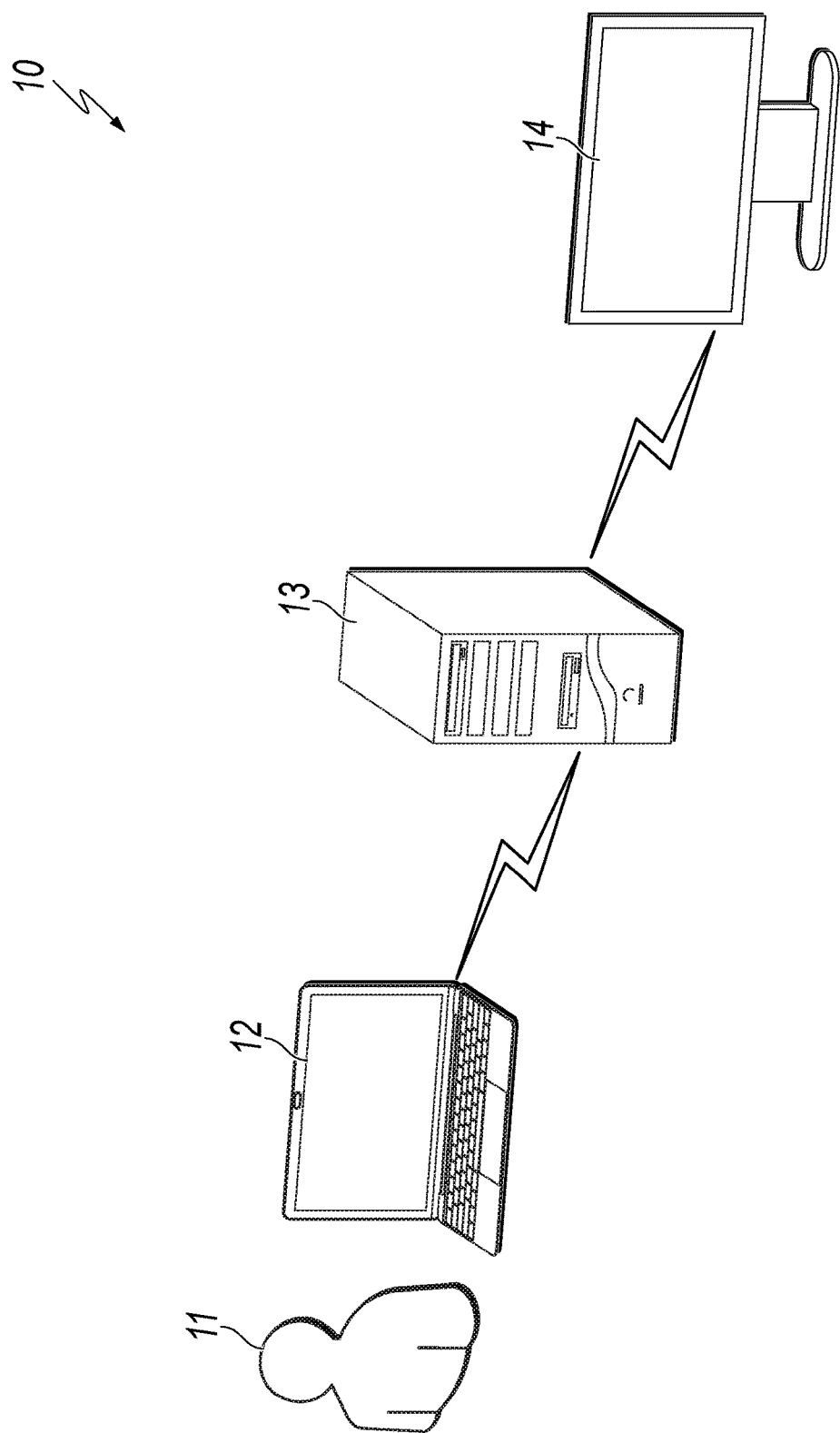
FIG. 1 is a schematic architectural diagram illustrating a digital certificate management system, according to an implementation of the present specification.

The following describes in detail features and example implementations of various aspects of the present specification. To make objectives, technical solutions, and advantages of the present specification clearer, the following further describes the present specification in detail with reference to the accompanying drawings and the implementations. It should be understood that specific implementations described here are configured only to explain but not limit the present specification. A person skilled in the art can implement the present specification without some of these specific details. The following descriptions of the implementations are merely intended to provide a better understanding of the present specification by illustrating examples of the present specification.

It should be noted that in the present specification, relational terms such as "first" and "second" are only used to distinguish one entity or operation from another, and do not necessarily require or imply that any actual relationship or sequence exists between these entities or operations. Moreover, the terms "include", "comprise", or any other variant is intended to cover a non-exclusive inclusion, so that a process, a method, an article, or a device that includes a list of elements not only includes those elements but also includes other elements which are not expressly listed, or further includes elements inherent to such a process, method, article, or device. An element preceded by "includes . . . " does not, without more constraints, preclude the existence of additional identical elements in the process, method, article, or device that includes the element.

In one or more implementations of the present specification, a digital certificate is a file that includes public key owner information and a public key and that is digitally signed by a third-party certificate authority (CA). The third-party CA in the implementations of the present specification refers to a digital certificate authority and a user certificate authority. The third-party CA can authorize a certificate based on a certificate issue request submitted by a certificate server 13, so as to prevent the certificate from being forged or tampered with, and manage the certificate and a key.

In the implementations described in the present specification, a digital certificate can implement functions such as asymmetric encryption, financial compliance verification, and electronic signature in digital service scenarios that need interaction information validity check. Information carriers in an Internet of Things (IoT) system, a mobile terminal, a personal computer (PC), and other Internet environments can all serve the data service scenarios that may require information validity check.

In the implementations of the present specification, a user can include a type B user or a type C user that processes a digital service by using a browser. For example, the type B user can be a user in an organization form that processes a digital service by using a browser, such as an enterprise user or a subscription user. The type C user can be an individual that processes a digital service by using a browser.

In the implementations of the present specification, due to their work nature, a large number of users need to use browsers running on terminal devices to perform information exchange and business activities in network environments in a browser-based World Wide Web (WEB) mode. However, as a digital certificate needs to be installed locally on a terminal device, complexity and stability of a local data transmission channel between a browser and the terminal device are affected by diversity of browsers and operating systems.

With continuous upgrade of browser technologies and permission control in different browsers, users need to use controls of browsers to communicate with a certificate server end, so that validity can be checked for interaction information between parties in data service application scenarios. For example, the controls of the browsers can include but are not limited to the Netscape Plugin Application Programming Interface (NPAPI), a native client plug-in, the ActiveX control enabling object-oriented program technologies and tools, and a computer communications protocol WebSocket control that provides a full-duplex communication (for example, two-way communication) channel between a browser and a certificate server by using a single transport-layer Transmission Control Protocol (TCP) connection.

At least one or more implementations of the present specification provide a certificate application method and apparatus, a terminal device, a gateway device, and a server. Through decoupling from a browser, digital certificate application and use in an operating system are independent of the browser. As such, when a user checks validity of interaction information between parties in a network environment in the browser-based WEB mode, browser dependency and browser control dependency can be reduced and reliability of data interaction information in data service scenarios can also be ensured.

In the description of the implementations of the present specification, a digital certificate can include a device certificate and a user certificate. The device certificate can be understood as being used to identify a specified device, and perform security verification on a device used in data interaction information verification. The user certificate can be understood as being used to identify a user in an Internet data service, and implement user identity verification and user signature.

Figure 2:
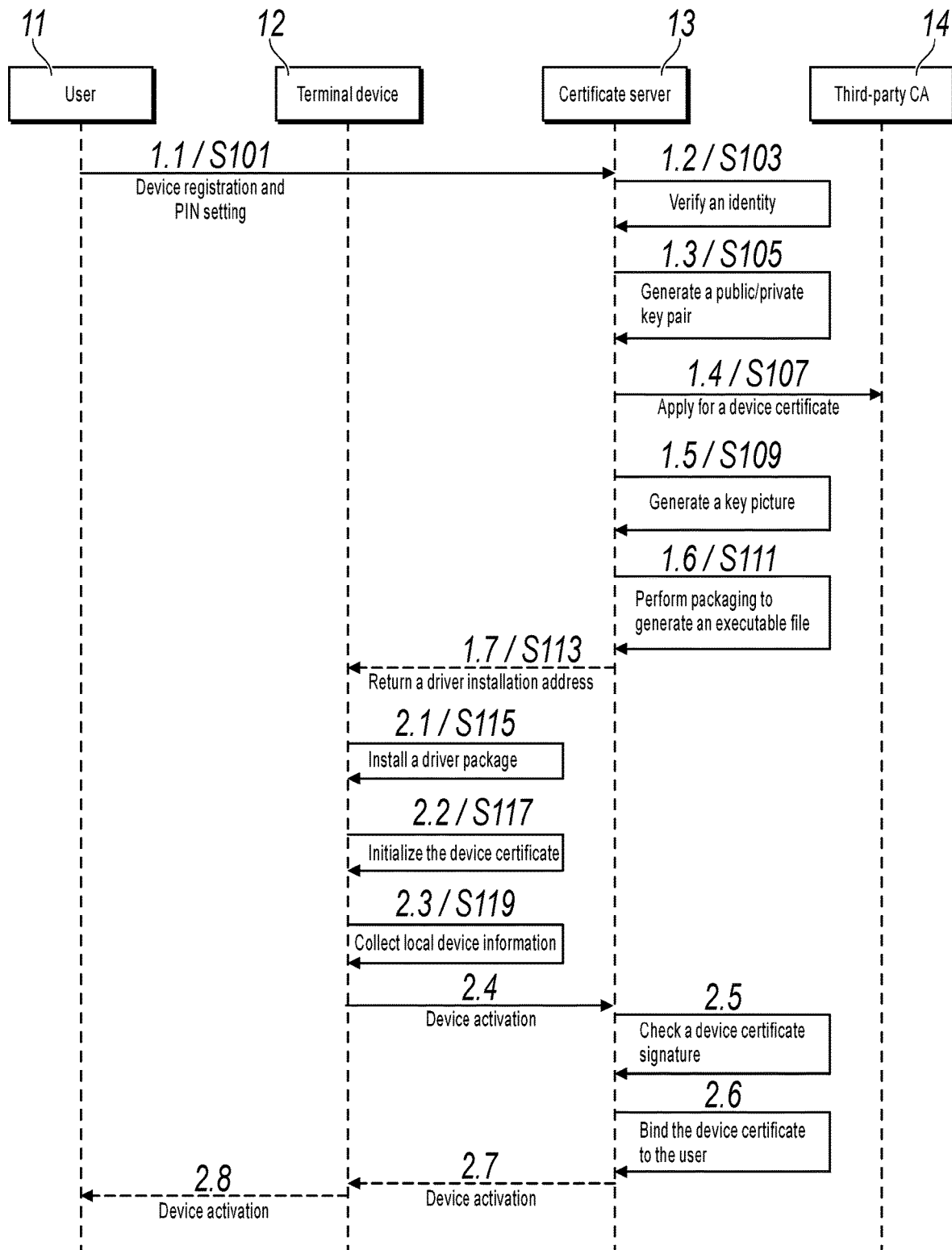
FIG. 2 is a schematic signaling flowchart illustrating a process of device registration, certificate driver installation, and device activation, according to an implementation of the present specification.

The following description, with reference to FIG. 1 and FIG. 2, describes a specific process of device registration, certificate driver installation, and device activation in one or more implementations. FIG. 1 is a schematic architectural diagram illustrating a digital certificate management system, according to an implementation of the present specification. FIG. 2 is a schematic signaling flowchart illustrating a process of device registration, certificate driver installation, and device activation, according to an implementation of the present specification.

As shown in FIG. 1, in an implementation, a data certificate management system 10 can include a terminal device 12, a certificate server 13, and a third-party certificate authority 14.

The terminal device 12 can be a personal computer (PC). For example, a mobile phone terminal, a desk computer, a desktop computer, a notebook computer, a netbook, a tablet, a superbook, etc. fall into a personal computer category. The certificate server 13 can be a server, a server cluster, or a cloud platform that performs identity authentication on a device and a user. In the description of the following implementations of the present specification, the terminal device 12 can be, for example, a PC device.

A user 11 can be a type B user or a type C user that processes a digital service by using a browser. For example, the type B user can be a user in an organization form that processes a digital service by using a browser, such as an enterprise user or a subscription user. The type C user can be an individual that processes a digital service by using a browser.

As shown in FIG. 2, in an implementation, device registration can specifically include the following steps:

Step S101: As shown in "1.1 Device registration and PIN setting" in FIG. 2, a user submits a device name and a personal identification number (PIN) on a digital service processing WEB page when a digital certificate is needed for digital service processing. Because the PIN is set by the user, only the user currently using the device knows the PIN. Therefore, the PIN can be considered as a user password locally set by the user, and is used to identify the user that currently logs in to the device. As an example, the PIN can be a number with a specified quantity of places set by the user.

Step S103: As shown in "1.2 Verify an identity" in FIG. 2, when receiving a device registration request of the user, the certificate server 13 triggers user identity verification. In the implementations of the present specification, there can be multiple methods for user identity verification. For example, identity verification information can include but is not limited to information such as a text message verification code, a facial image, and fingerprint information.

Step S105: As shown in "1.3 Generate a public/private key pair" in FIG. 2, the certificate server 13 can generate a public/private key pair of a device certificate.

At the present step, device certificate generation algorithms include but are not limited to the asymmetric encryption algorithm RSA, the elliptic curve public-key encryption algorithm SM2, etc. The public/private key pair of the device certificate can include a public key and a private key of the device certificate.

Step S107: As shown in "1.4 Apply for a device certificate" in FIG. 2, the certificate server 13 can encapsulate the public key of the device certificate, the device name, and the identity verification information to generate a device certificate registration request and request to generate a device certificate from the third-party CA.

Step S109: As shown in "1.5 Generate a key picture" in FIG. 2, the certificate server 13 can store the private key of the device certificate in an encrypted file in a specified format based on a white-box encryption method by using the PIN uploaded at step S101 as an encryption key. As an example, the encrypted file in the specified format can be, for example, an encrypted picture.

At the present step, white-box encryption is used as an encryption algorithm technology that can resist white-box attacks, perform file obfuscation on the keys of the device certificate, and after the file obfuscation, uniformly provide an encryption interface, a decryption interface, an interface for adding a device certificate signature, and an interface for verifying a device certificate signature.

Step S111: As shown in "1.6 Perform packaging to generate an executable file" in FIG. 2, the certificate server 13 can perform packaging to generate a certificate driver installation file package based on the stored encrypted file of the private key of the device certificate. The certificate driver installation package can be an executable file.

Step S113: As shown in "1.7 Return a driver installation address" in FIG. 2, the certificate server 13 returns a driver installation address to the terminal device 12.

Still referring to FIG. 2, certificate driver installation can specifically include the following steps:

Step S115: As shown in "2.1 Install a driver package" in FIG. 2, the terminal device 12 obtains the certificate driver installation package based on the driver installation address, and installs a certificate driver by using the certificate driver installation package, so as to locally save the device certificate.

Step S117: As shown in "2.2 Initialize the device certificate" in FIG. 2, after installing the certificate driver on the terminal device 12, the user 11 starts to initialize the device certificate.

At the present step, during device certificate initialization, the user 11 enters the PIN. The terminal device 12 uses the PIN as a decryption key, and restores the private key of the device certificate by using a specific mathematical equation.

Step S119: As shown in "2.3 Collect local device information" in FIG. 2, the terminal device 12 can perform device certificate signing on collected device information by using the private key of the device certificate.

At the present step, the device information can include, for example, one or more of the following information items: a physical address (namely, Media Access Control (MAC) address) of the device, a device identifier DeviceID, an Internet Protocol (IP) address of the device, information about an operating system of the device, information about a network used by the device, central processing unit (CPU) information, and a device signature random number.

With DeviceID, a device identification code is automatically generated after installation of the certificate driver is complete. The device signature random number is a number randomly generated when the device certificate is signed, and is used to make it difficult to reproduce original text that undergoes the current device certificate signing, so as to ensure uniqueness and data security of the device certificate signature.

Still referring to FIG. 2, in an implementation, device activation can specifically include the following steps:

As shown in "2.4 Device activation" in FIG. 2, the terminal device 12 generates a device activation request based on the device information that undergoes the device certificate signing, and sends the device activation request to the server 13.

As shown in "2.5 Check a device certificate signature" in FIG. 2, the server 13 verifies the device certificate signature based on the device activation request by using the public key of the device certificate, and when the verified device certificate signature is correct, obtains the device information reported by using the device activation request.

As shown in "2.6 Bind the device certificates to the user" in FIG. 2, when the verified device certificate signature is correct, the user is bound to the device certificate. The device certificate can identify a device related to the device information, and the user is a user that enters the PIN to log in to the current device.

As shown in "2.7 Device activation" in FIG. 2, the certificate server 13 returns activation completion information to the terminal device 12. As shown in "2.8 Device activation" in FIG. 2, the terminal device 12 generates prompt information to prompt the user 11 that the activation is complete.

According to the description in the above implementations, the user is bound to the device certificate through the specific processes of device registration, certificate driver installation, and device activation.

Figure 3:
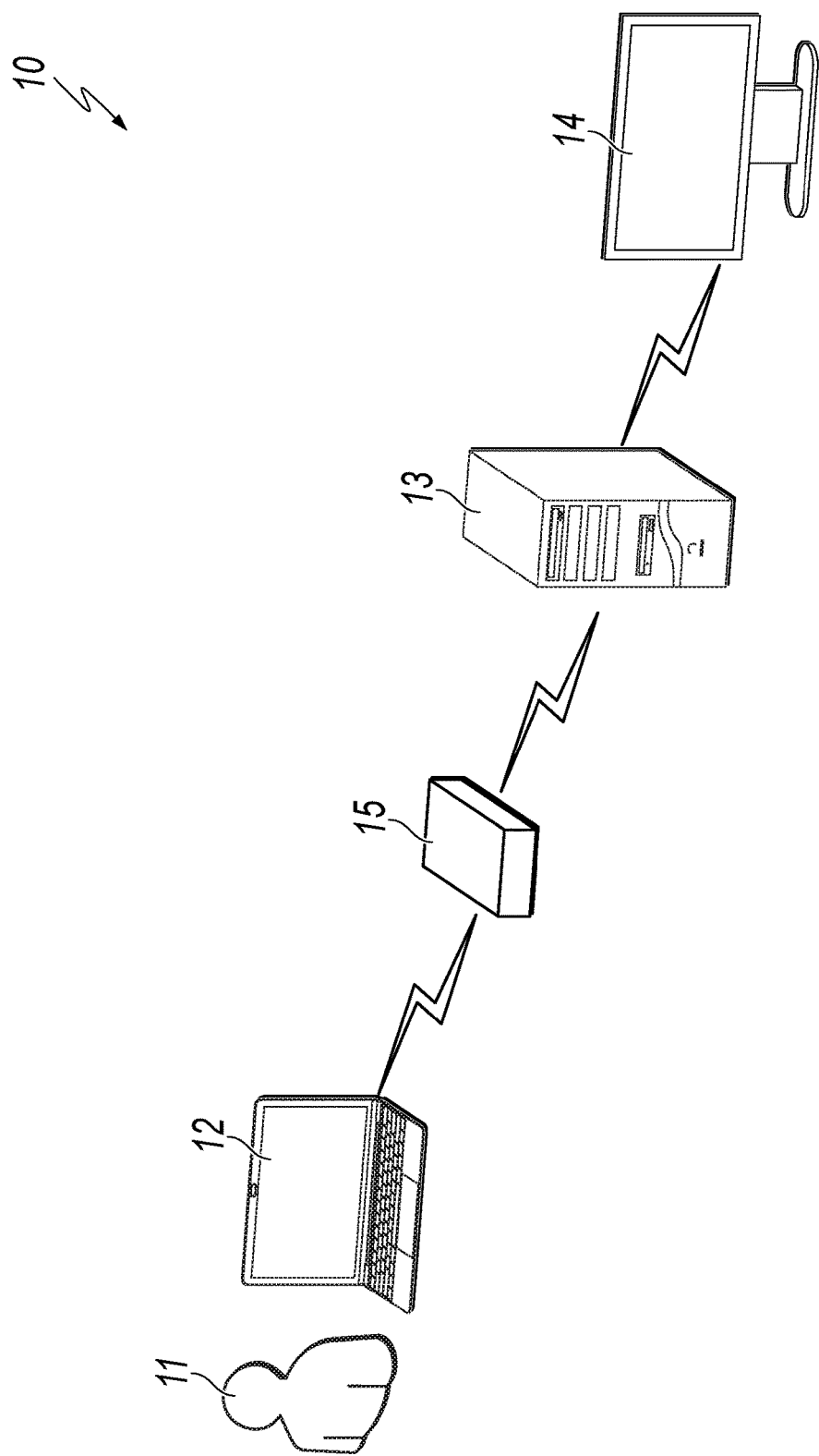
FIG. 3 is a schematic architectural diagram illustrating a digital certificate management system, according to an implementation of the present specification.
Figure 4:
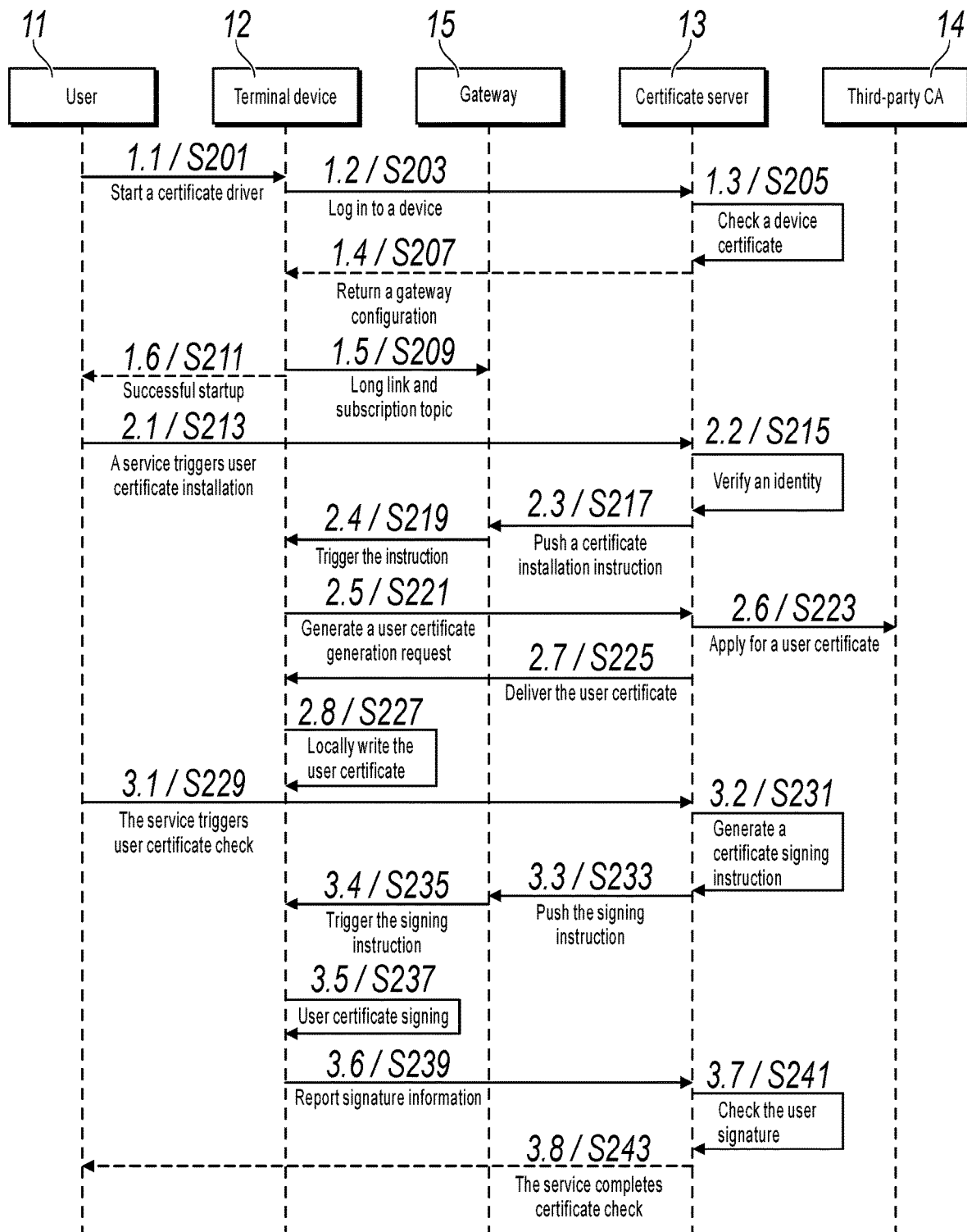
FIG. 4 is a schematic signaling flowchart illustrating user certificate application, user certificate installation, and user certificate check, according to an implementation of the present specification.

The following description, with reference to FIG. 3 and FIG. 4, describes specific processes of user certificate application, user certificate installation, and user certificate verification in one or more implementations of the present specification. FIG. 3 is a schematic architectural diagram illustrating a digital certificate management system, according to an implementation of the present specification. FIG. 4 is a schematic signaling flowchart illustrating processes of user certificate application, user certificate installation, and user certificate verification, according to an implementation of the present specification. FIG. 3 and FIG. 4 use reference numerals same as the reference numerals in FIG. 1 and FIG. 2 to denote structures that are the same with or equivalent to structures in FIG. 1 and FIG. 2.

As shown in FIG. 3, the digital certificate management system 10 can further include a gateway 15. In the implementations of the present specification, the gateway 15 includes a computer system or a device that can implement network interconnection.

As shown in FIG. 4, in an implementation, user certificate application can specifically include the following steps:

Step S201: As shown in "1.1 Start a certificate driver" in FIG. 4, the user 11 starts a certificate driver on the terminal device 12. When the certificate driver is started for the first time, the terminal device 12 prompts the user 11 to enter a PIN, and the PIN is used to determine a user that logs in to the device.

Step S203: As shown in "1.2 Log in to a device" in FIG. 4, the certificate driver calls a device certificate to perform device certificate signing on device identification information including a device identifier ID, and reports the device identification information that undergoes the device certificate signing to the certificate server.

At the present step, the device identification information can further include a device signature random number.

Step S205: As shown in "1.3 Check a device certificate" in FIG. 4, the certificate server 13 calls the device certificate to verify a certificate signature.

At the present step, when verifying the device certificate signature, the certificate server 13 can use the device certificate to associate, through a binding relationship between the device certificate and the user, a user that logs in to the device.

Step S207: As shown in "1.4 Return a gateway configuration" in FIG. 4, when verifying that the device certificate signature is correct, the certificate server 13 can obtain information about the user bound to the device certificate based on the device identifier ID in the device identification information, and deliver, to the device that the user logs in to, configuration information of the gateway linked to the terminal device.

At the present step, the configuration information of the gateway can include device identification information such as a device identification code, a gateway key, a gateway address, and a gateway subscription topic name. The device identification code is used to identify a device that needs to establish a data transmission channel with the gateway. The gateway key is used to check a data link request sent by the device to the gateway, and if the check succeeds, it is allowed to establish a data transmission channel. The gateway subscription topic name is used to indicate that the terminal device 12 needs to subscribe to a specified topic. The gateway 15 serves as a message producer. The certificate server 13 pushes a message to the topic, and the terminal device 12 subscribing to the topic can receive the message.

Step S209: As shown in "1.5 Long link and subscription topic" in FIG. 4, the terminal device 12 subscribes to a message topic from the gateway 15, so as to establish a data transmission channel between the gateway 15 and the terminal device 12.

In an implementation, the data transmission channel established when data is exchanged between the terminal device 12 and the gateway 15 is a long-link-based data transmission channel, which can reduce a network resource waste caused by frequent establishment of data transmission channels with the gateway and save network resources.

In an implementation, the gateway 15 supports a device communication protocol that is based on a publish topic and/or a subscription topic, including the Message Queuing Telemetry Transport (MQTT) protocol. The MQTT protocol is a data transmission protocol that belongs to the Internet of Things, and is applicable to a network restricted environment. The MQTT protocol uses the Transmission Control Protocol/Internet Protocol (TCP/IP) to provide a network connection, and can provide a message subscription mode and a message sending mode. When a message is published in a one-to-many (for example, different devices) mode by using the gateway, coupling with other applications such as a browser control can be removed.

In the implementations of the present specification, based on the MQTT protocol, after the terminal device and the gateway establish the data transmission channel, the certificate server can serve as a message sender, the terminal device can serve as a message subscriber, and the gateway can serve as a message proxy. Specifically, when the message sender sends a message corresponding to a topic to the message proxy, the message proxy can send the message corresponding to the topic to all message subscribers that subscribe to the topic.

In the implementations of the present specification, a connection between the certificate server and the gateway can be established in advance. The gateway can serve as a message proxy and be responsible for receiving all message data from the certificate server, determining a topic corresponding to the obtained message data, and then sending the message data to a terminal device that subscribes to the topic.

In an implementation, a message topic can be understood as a message type, and the message type corresponds to a data transmission channel between a gateway and a terminal device. After subscribing to a topic, the terminal device can receive message content of the topic that is forwarded by the gateway.

The MQTT protocol uses a publish/subscription message communication mode, and the publish/subscription message communication mode is characterized by service discovery. With the message topic subscription mode, a server end (the message producer) and a terminal device (the message subscriber) can be better decoupled. In a MQTT-based message transmission process, a data connection channel is established between the terminal device and the gateway based on the MQTT protocol. The certificate server pushes message data corresponding to a subscription topic to the terminal device by using the gateway, and no other configuration file or no third-party plug-in is needed in the communication process. Therefore, dependency of both communication parties on a browser control can be removed.

In an implementation, after the certificate driver is installed on the terminal device 12, a long link between the terminal device 12 and the gateway 15 can be established based on the MQTT protocol each time the terminal device 12 is started.

In the following description of the implementations of the present specification, a gateway using the MQTT protocol will be referred to as an MQTT gateway for short, and a channel used by the gateway to transmit data to a device will be referred to as a downlink channel between the MQTT gateway and the device.

In an implementation, when data transmission to multiple devices is performed by using the MQTT gateway, data communication can be performed on the downlink channel in an asynchronous communication way. The certificate server sends an instruction to the MQTT gateway, and the MQTT gateway can exchange data with the device through an asynchronous call mechanism by using a two-way communication connection to the device.

In an implementation, a remote procedure call is a method for using the Remote Procedure Call (RPC) protocol. In the method, a service is requested from a remote computer by using a network, and there is no need to understand an underlying network technology.

In this implementation, by using a data transmission channel established between the gateway 15 and the terminal device 12 based on the MQTT protocol, the certificate server 13 can locally perform a remote procedure call on the device, and directly push an instruction or a certificate obtained through application to the device, so as to implement decoupling from browser compatibility.

Step S211: As shown in "1.6 Successful startup" in FIG. 4, after establishing the data transmission channel with the gateway 15, the terminal device 12 can send prompt information indicating successful certificate driver startup to the user 11.

Still referring to FIG. 4, in an implementation, user certificate installation can specifically include the following steps:

Step S213: As shown in "2.1 A service triggers user certificate installation" in FIG. 4, when using a browser to process a data service, the user 11 triggers the step of user certificate installation and the step of user certificate check based on a processed data service.

Step S215: As shown in "2.2 Verify an identity" in FIG. 4, the certificate server 13 can adopt an identity verification method to verify the principal information of a user who needs to apply for a user certificate.

At the present step, the certificate server 13 adopts the PIN entered by the user 11 at step S201 to determine the user 11 that logs in to the device, so as to obtain principal information of the user 11 and verify the principal information. When the principal information of the user is successfully verified, the certificate server 13 can establish an association between the device certificate and the user.

Step S217: As shown in "2.3 Push a certificate installation instruction" in FIG. 4, the certificate server pushes a user certificate installation instruction to the terminal device 12 by using the data transmission channel established between the terminal device 12 and the gateway 15.

At the present step, during delivery of the user certificate installation instruction, the certificate server 13 can associate with a device based on a user that logs in to the device, and deliver the user certificate installation instruction to the device.

In an implementation, the user certificate installation instruction includes the following pushed content: a pushed content challenge code, verified certificate principal information, and algorithm information. The challenge code can be used to perform encryption verification on the pushed content in the user certificate installation instruction, so as to ensure that real information of a user in a transmission process of the user certificate installation instruction is not disclosed. The algorithm information is used to generate a key pair of the user certificate.

Step S219: As shown in "2.4 Trigger the instruction" in FIG. 4, the gateway 15 sends the user certificate installation instruction to the terminal device 12 by using the data transmission channel between the gateway 15 and the terminal device 12.

Step S221: As shown in "2.5 Generate a user certificate generation request" in FIG. 4, the terminal device 12 generates a public/private key pair of the user certificate based on the algorithm information, where the public/private key pair of the user certificate includes a public key and a private key of the user certificate. The terminal device 12 encapsulates the public key of the user certificate, the verified certificate principal information, and signature information of the public key of the user certificate that is obtained by using the private key of the user certificate, so as to obtain a user certificate generation request.

Step S223: As shown in "2.6 Apply for a user certificate" in FIG. 4, the certificate server 13 receives the user certificate generation request, forwards the user certificate generation request to the third-party CA 14, and requests the third-party CA 14 to generate a user certificate.

Step S225: As shown in "2.7 Deliver the user certificate" in FIG. 4, the certificate server 13 delivers the user certificate obtained through application to the terminal device 12.

Step S227: As shown in "2.8 Locally write the user certificate" in FIG. 4, the terminal device 12 writes the received user certificate information into the local device, so as to complete the user certificate installation procedure.

Still referring to FIG. 4, in an implementation, user certificate check can specifically include the following steps:

Step S229: As shown in "3.1 The service triggers user certificate check" in FIG. 4, when the user 11 processes a data service by using a browser, the certificate server 13 needs to check the user certificate based on the processed data service.

Step S231: As shown in "3.2 Generate a certificate signing instruction" in FIG. 4, the certificate server 13 generates a user certificate signing instruction, where encapsulated information in the user certificate signing instruction includes information such as original text to be signed, a user signature random number, a user signature challenge code, a device identification code, and a user certificate code that are generated based on the processed data service.

At the present step, during delivery of the user certificate signing instruction, the certificate server 13 pushes the information based on the device that the user 11 is logged in to.

Step S233: As shown in "3.3 Push the signature instruction" in FIG. 4, the certificate server 13 delivers the user certificate signing instruction to the gateway 15.

Step S235: As shown in "3.4 Trigger the signature instruction" in FIG. 4, the gateway 15 sends the user certificate installation instruction to the terminal device 12 by using the data transmission channel between the gateway 15 and the terminal device 12.

Step S237: As shown in "3.5 User certificate signing" in FIG. 4, the terminal device 12 receives the user certificate signing instruction, and selects a corresponding user certificate based on the user certificate code, so as to use the private key of the user certificate to perform user certificate signing on the original text to be signed.

Step S239: As shown in "3.6 Report signature information" in FIG. 4, the terminal device 12 reports the user certificate signature to the certificate server 13.

Step S241: As shown in "3.7 Check the user signature" in FIG. 4, the certificate server 13 verifies the user signature by using the public key of the user certificate, so as to verify the user certificate.

Step S243: As shown in "3.8 The service completes certificate check" in FIG. 4, when successfully verifying the user certificate, the certificate server 13 returns prompt information indicating a user certificate check success to the terminal device 12.

In the user certificate application, user certificate installation, and user certificate check described in the previous implementations of the present specification, information can be pushed to a local device by using a downlink data transmission channel between the device and a gateway that supports a publish/subscription topic-based device communication protocol such as the MQTT protocol, so as to implement decoupling between a user certificate and browser compatibility.

Figure 5:
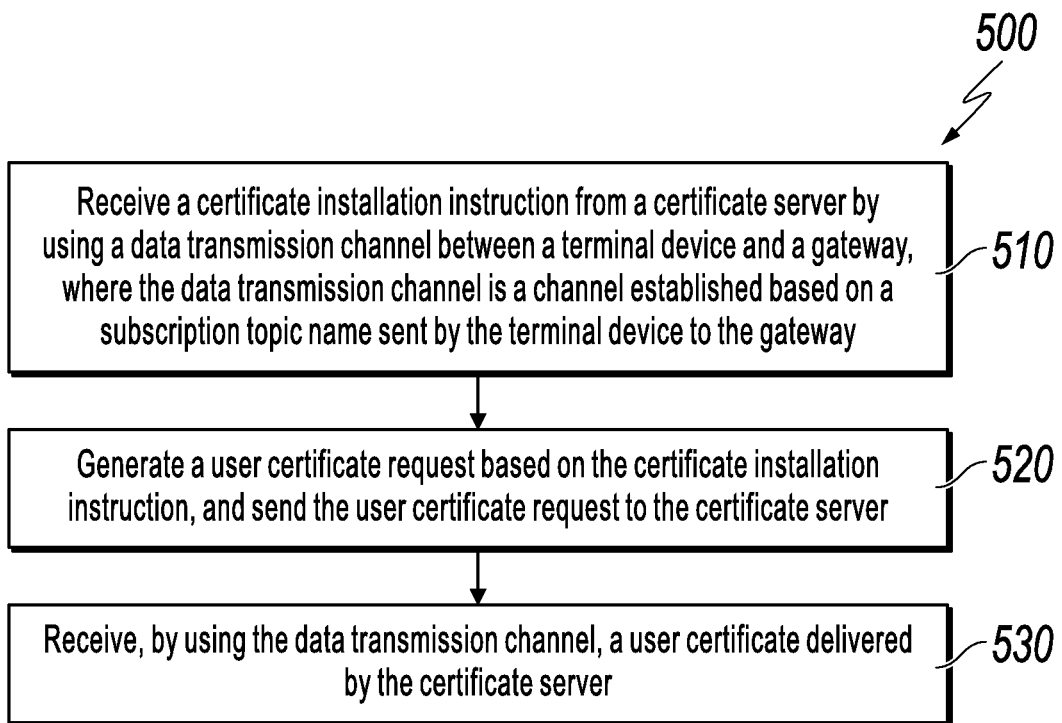
FIG. 5 is a flowchart illustrating a certificate application method, according to an implementation of the present specification.

FIG. 5 is a flowchart illustrating a certificate application method, according to an implementation of the present specification. As shown in FIG. 5, a certificate application method 500 in the implementation of the present specification includes the following steps:

Step S510: Receive a certificate installation instruction from a certificate server by using a data transmission channel between the terminal device and a gateway, where the data transmission channel is a channel established based on a subscription topic name sent by the terminal device to the gateway.

Step S520: Generate a user certificate request based on the certificate installation instruction, and send the user certificate request to the certificate server.

Step S530: Receive by using the data transmission channel, a user certificate delivered by the certificate server.

According to the certificate application method in the implementation of the present specification, a device can receive a certificate installation instruction and a user certificate from a certificate server by using a data transmission channel between the device and a gateway. As such, a more reliable solution for using a user digital certificate is provided, and compatibility between digital certificate use and a browser can be implemented in an operating system dimension.

In an implementation, the certificate installation instruction is generated by the certificate server based on a service type of a service requested by a receiving browser, and the browser runs on the terminal device.

In an implementation, the certificate application method 500 can further include the following steps:

Step S540: Receive gateway configuration information sent by the certificate server, where the gateway configuration information includes a device identification code, a gateway key, a gateway address, and a subscription topic name, and the device identification code is used to identify the terminal device.

Step S542: Establish a link between the terminal device and the gateway based on the gateway key and the gateway address.

Step S544: Send the device identification code and the subscription topic name to the gateway, so as to establish a data transmission channel corresponding to the subscription topic name, where the data transmission channel is used to transmit, to the terminal device, message data corresponding to the subscription topic name.

In the implementation, the terminal device can establish a data transmission channel with the gateway by using the received gateway configuration information. The gateway supports a device communication protocol that is based on a published topic and/or a subscription topic.

In an implementation, the device communication protocol includes the Message Queuing Telemetry Transport protocol.

In an implementation, step S520 can specifically include the following steps:

Step S521: Obtain pushed content in the certificate installation instruction, where the pushed content includes a pushed content challenge code, verified certificate principal information, and algorithm information.

Step S523: Generate a user certificate key pair by using the algorithm information, and digitally sign a public key in the user certificate key pair by using a private key in the user certificate key pair to obtain a public key having a user certificate signature.

Step S525: Encapsulate the public key having the user certificate signature and the verified certificate principal information to obtain the user certificate request.

In the implementation, the terminal device generates the key pair of the user certificate based on the pushed content in the certificate installation instruction pushed by the certificate server, and generates the user certificate request after signing the public key of the user certificate by using the private key of the user certificate, so that the certificate server authorizes the user certificate to a third-party CA based on the user certificate request.

In an implementation, the certificate application method 500 can further include the following steps:

Step S550: Receive a user certificate signing instruction by using the data transmission channel, and obtain signature check original text, a device identification code, and a user certificate code in the user certificate signing instruction.

Step S552: Select a user certificate corresponding to the user certificate code on a terminal device having the device identification code, and sign the signature check original text by using a private key in a key pair of the selected user certificate to obtain signature check original text having a user certificate signature.

Step S554: Send the signature check original text having the user certificate signature to the certificate server, so as to check the user certificate.

In the implementation, after signing the signature check original text by using the user certificate, the terminal device requests the certificate server to check the user certificate signature.

In an implementation, the certificate application method 500 can further include the following steps:

Step S560: Submit a device name and a user identification code to the certificate server, where the user identification code is used for user identity check during device certificate application, and the device name is used to identify a terminal device, where a device certificate that is applied for belongs to the terminal device.

Step S562: Obtain a driver installation file by using a received driver installation address, and install a certificate driver by using the driver installation file to obtain the device certificate and an encrypted key file that are packaged in the driver installation file.

Step S564: Decrypt the encrypted key file based on the submitted user identification code, to obtain a private key in a key pair of the device certificate.

In the implementation, the terminal device requests device certificate installation from the certificate server to obtain the key file of the device certificate.

In an implementation, the certificate application method 500 can further include the following steps:

Step S570: Digitally sign obtained device information by using the private key in the key pair of the device certificate, to obtain device activation information having a device certificate signature.

Step S572: Send the device activation information to the certificate server, so as to activate the device certificate.

Step S574: Establish a mapping relationship between a user identified by the user identification code and the device certificate.

In an implementation, the device name and the input user identification code are information submitted by the certificate server by using an information collection page of a browser, and the information collection page is generated by the certificate server when the browser needs to use a device certificate for service processing.

In the implementation, the terminal device requests device certificate activation from the server, and after the device certificate is activated, binds the user to the device certificate to form a mapping relationship between the user and the device certificate.

Figure 6:
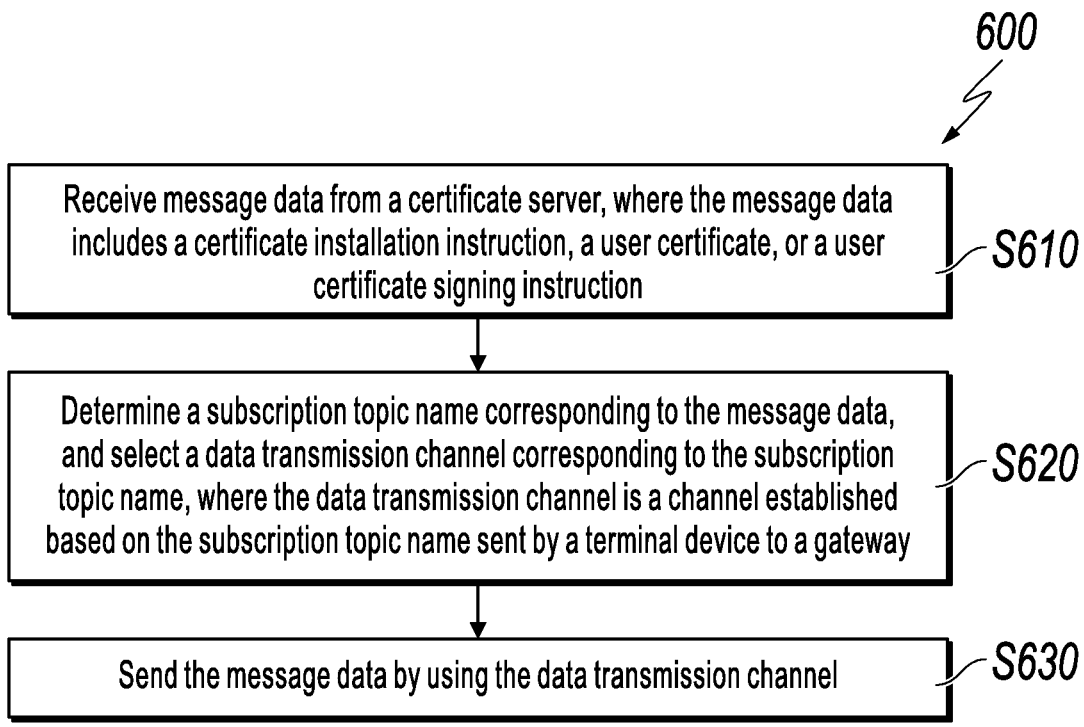
FIG. 6 is a flowchart illustrating a certificate application method, according to an implementation of the present specification.

FIG. 6 is a flowchart illustrating a certificate application method, according to an implementation of the present specification. As shown in FIG. 6, a certificate application method 600 in the implementation of the present specification includes the following steps:

Step S610: Receive message data from a certificate server, where the message data includes a certificate installation instruction, a user certificate, or a user certificate signing instruction.

Step S620: Determine a subscription topic name corresponding to the message data, and select a data transmission channel corresponding to the subscription topic name, where the data transmission channel is a channel established based on the subscription topic name sent by a terminal device to the gateway.

Step S630: Send the message data by using the data transmission channel.

As an example, the gateway receives the certificate installation instruction from the certificate server, determines the subscription topic name corresponding to the certificate installation instruction, selects the data transmission channel corresponding to the subscription topic name, and sends the certificate installation instruction to the terminal device by using the data transmission channel between the gateway and the terminal device.

According to the certificate application method in the implementation of the present specification, the gateway pushes, to the terminal device by using the data transmission channel between the gateway and the terminal device, the instruction received from the certificate server. No browser control is used in the data transmission process, and decoupling from browser compatibility can be implemented.

In an implementation, the certificate application method 600 can further include the following steps:

Step S650: Receive a gateway key from the terminal device.

Step S652: Establish a link between the terminal device and the gateway when the gateway key is successfully verified.

Step S654: Receive a device identification code and the subscription topic name, and establish the data transmission channel corresponding to the subscription topic name, where the device identification code is used to identify the terminal device.

In the implementation, after it is verified that the gateway key is correct, a downlink data transmission channel from the gateway to the terminal device is established by way of topic subscription, and the instruction delivered by the certificate server is transmitted to the terminal device.

In an implementation, the certificate application method 600 can further include the following steps:

Step S660: The gateway receives the user certificate signing instruction from the certificate server, where the user certificate signing instruction is used to check the user certificate.

Step S662: Send the user certificate signing instruction to the terminal device by using the data transmission channel between the gateway and the terminal device.

In an implementation, the gateway supports a device communication protocol that is based on a publish topic and/or a subscription topic, and the device communication protocol includes the Message Queuing Telemetry Transport protocol.

In an implementation, the data transmission channel is a data transmission channel established based on the Message Queuing Telemetry Transport protocol.

Figure 7:
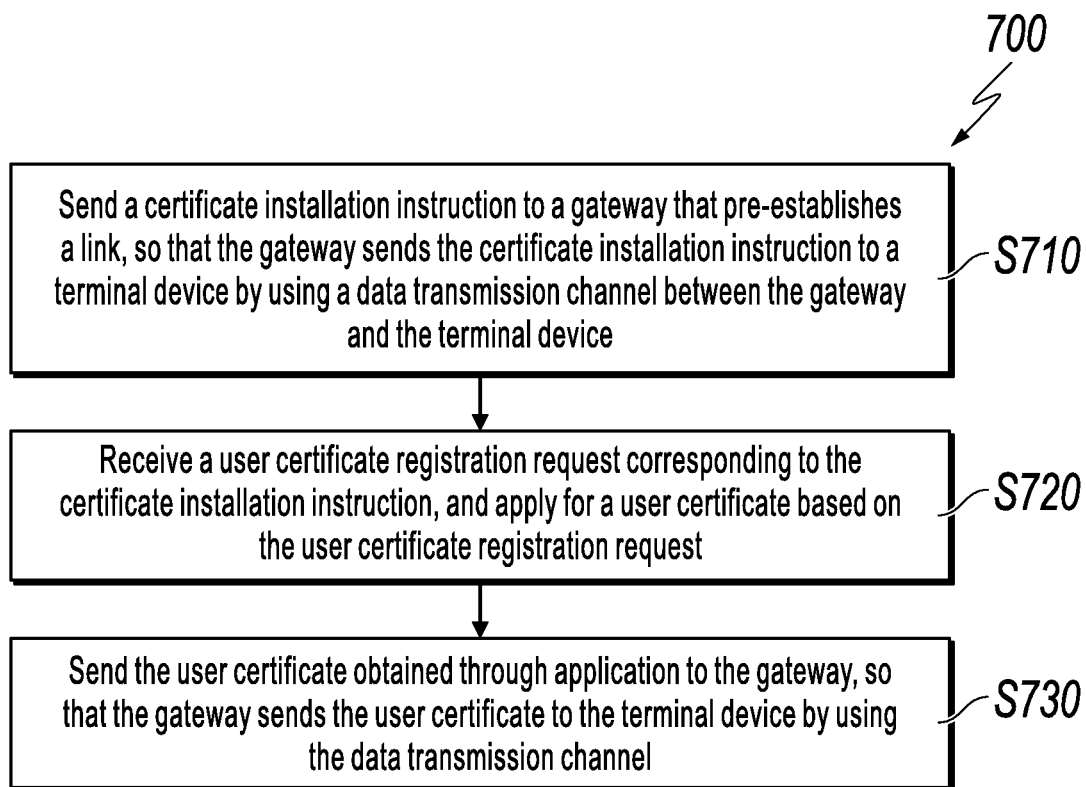
FIG. 7 is a flowchart illustrating a certificate application method, according to another implementation of the present specification.

FIG. 7 is a flowchart illustrating a certificate application method, according to another implementation of the present specification. As shown in FIG. 7, a certificate application method 700 in the implementation of the present specification includes the following steps:

Step S710: Send a certificate installation instruction to a gateway that pre-establishes a link, so that the gateway sends the certificate installation instruction to a terminal device by using a data transmission channel between the gateway and the terminal device, where the data transmission channel is a channel established based on a subscription topic name sent by the terminal device to the gateway, and message data corresponding to the subscription topic name includes the certificate installation instruction.

Step S720: Receive a user certificate registration request corresponding to the certificate installation instruction, and apply for a user certificate based on the user certificate registration request.

Step S730: Send the user certificate obtained through application to the gateway, so that the gateway sends the user certificate to the terminal device by using the data transmission channel.

According to the certificate application method in the implementation of the present specification, the certificate server pushes the instruction to the gateway, so that the gateway transmits the instruction to the terminal device by using the data transmission channel between the gateway and the terminal device. No browser control is used in the data transmission process, and decoupling from browser compatibility can be implemented.

In an implementation, step S710 can specifically include the following steps:

Step S711: Determine a device login user identified by a received user identification code.

Step S713: Receive device identification information having a device certificate signature, and obtain a key pair of a device certificate corresponding to the device identification information.

Step S715: Verify the device certificate signature by using a public key in the key pair of the device certificate.

Step S717: If a verification result of the device certificate signature is a success, obtain identity information of the device login user from identity information of a user that has a mapping relationship with the device certificate.

Step S719: Send the certificate installation instruction to the gateway when the identity information of the device login user is successfully verified.

In the implementation, after verifying the user identity information, the certificate server pushes the certificate installation instruction to the terminal device by using the gateway, so that the terminal device generates the user certificate request based on the certificate installation instruction.

In an implementation, the certificate application method 700 can further include the following step:

Step S740: Deliver gateway configuration information to the terminal device if the verification result of the device certificate signature is a success, so that the terminal device establishes the data transmission channel with the gateway based on the gateway configuration information.

In an implementation, the certificate application method 700 can further include the following steps:

Step S750: Determine signature check original text of the user certificate based on a received user certificate check request.

Step S752: Determine a device login user identified by a received user identification code, and obtain device identification information of a device that the device login user logs in to and a user certificate code of the device login user.

Step S754: Encapsulate the signature check original text, the device identification information of the logged-in device, and the user certificate code to obtain a user certificate signing instruction, where the user certificate signing instruction is used to check the user certificate.

Step S756: Send the user certificate signing instruction to the gateway, so that the gateway sends the user certificate signing instruction to the terminal device by using the data transmission channel.

In the implementation, the certificate server pushes the user certificate signing instruction to the terminal device by using the data transmission channel between the gateway and the terminal device.

In an implementation, the certificate application method 700 can further include the following step:

Step S760: Receive signature check original text having a user certificate signature, and verify the user certificate signature based on a public key in a key pair of the user certificate.

In an implementation, the certificate application method 700 further includes the following steps:

Step S770: Apply, based on a received device name and user identification code, for a device certificate for a terminal device corresponding to the device name, and determine a key pair of the device certificate.

Step S772: Generate a driver installation file of the device certificate by using a private key in the key pair of the device certificate, and send the driver installation file to the terminal device.

Step S774: Receive device activation information having a device certificate signature, and verify the device certificate signature by using a public key in the key pair of the device certificate.

Step S776: When the device certificate signature is successfully verified, determine, based on the device activation information, that a login user identified by the user identification code is a user bound to the device certificate.

In the implementation, after applying for the device certificate, the certificate server can send a certificate driver to the terminal device, and activate the device certificate.

In an implementation, step S770 can specifically include the following steps:

Step S770-01: Determine a device login user identified by the received user identification code, and verify identity information of the device login user.

Step S770-03: When the identity information of the device login user is successfully verified, generate a key pair used to apply for the device certificate.

Step S770-05: Generate a device certificate request based on a public key in the key pair used to apply for the device certificate, the device name, and the identity information of the device login user, so as to apply for the device certificate based on the device certificate request.

Step S770-07: Use a key pair of the device certificate obtained through application as the key pair of the device certificate.

In an implementation, after verifying the user identity information, the certificate server applies for the device certificate and determines the public/private key pair of the device certificate.

In an implementation, step S772 can specifically include the following steps:

Step S772-01: Encrypt the private key in the key pair of the device certificate by using a specified key encryption method, to obtain an encrypted key file.

At the present step, the private key in the key pair of the device certificate can be encrypted by using a white-box encryption technology and by using the user identification code as a static encryption key, to obtain the encrypted key file.

Step S772-03: Package the device certificate and the encrypted key file to obtain the driver installation file of the device certificate.

According to the certificate application method in the implementation of the present specification, the certificate server can push a message to the gateway by using the Message Queuing Telemetry Transport protocol, so as to perform communication by using the data transmission channel locally established by the gateway and the terminal device, thereby reducing a problem that information exchange of a browser control is affected by browser compatibility, and implementing decoupling of a digital certificate from the browser.

Figure 8:
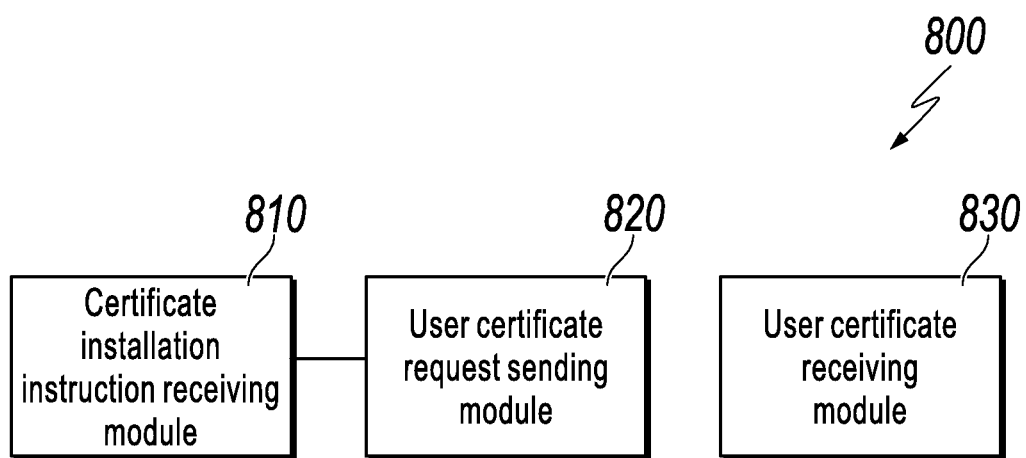
FIG. 8 is a schematic structural diagram illustrating a certificate application apparatus, according to an implementation of the present specification.

FIG. 8 is a schematic structural diagram illustrating a certificate application apparatus, according to an implementation of the present specification. As shown in FIG. 8, in an implementation, a certificate application apparatus 800 can include the following modules: a certificate installation instruction receiving module 810, configured to receive a certificate installation instruction from a certificate server by using a data transmission channel between a terminal device and a gateway, where the data transmission channel is a channel established based on a subscription topic name sent by the terminal device to the gateway; a user certificate request sending module 820, configured to generate a user certificate request based on the certificate installation instruction, and send the user certificate request to the certificate server; and a user certificate receiving module 830, configured to receive, by using the data transmission channel, a user certificate delivered by the certificate server.

In an implementation, the certificate installation instruction is generated by the certificate server based on a service type of a service requested by a receiving browser, and the browser runs on the terminal device.

In an implementation, the certificate application apparatus 800 can further include the following modules: a gateway configuration receiving module, configured to receive gateway configuration information sent by the certificate server, where the gateway configuration information includes a device identification code, a gateway key, a gateway address, and a subscription topic name, and the device identification code is used to identify the terminal device; a gateway address login module, configured to establish a link between the terminal device and the gateway based on the gateway key and the gateway address; and a data channel establishment module, configured to send the device identification code and the subscription topic name to the gateway, so as to establish a data transmission channel corresponding to the subscription topic name, where the data transmission channel is used to transmit, to the terminal device, message data corresponding to the subscription topic name.

In an implementation, in the certificate application apparatus 800:

A device communication protocol includes the Message Queuing Telemetry Transport protocol, and the data transmission channel is a data transmission channel established based on the Message Queuing Telemetry Transport protocol.

In an implementation, the user certificate request sending module 820 includes the following: a pushed content acquisition unit, configured to obtain pushed content in the certificate installation instruction, where the pushed content includes a pushed content challenge code, verified certificate principal information, and algorithm information; a user key pair generation unit, configured to generate a user certificate key pair by using the algorithm information, and digitally sign a public key in the user certificate key pair by using a private key in the user certificate key pair to obtain a public key having a user certificate signature; and a user certificate request unit, configured to encapsulate the public key having the user certificate signature and the verified certificate principal information to obtain the user certificate request.

In an implementation, the certificate application apparatus 800 can further include the following modules: a user signature instruction receiving module, configured to receive a user certificate signing instruction by using the data transmission channel, and obtain signature check original text, a device identification code, and a user certificate code in the user certificate signing instruction; a user certificate signing module, configured to select a user certificate corresponding to the user certificate code on a terminal device having the device identification code, and sign the signature check original text by using a private key in a key pair of the selected user certificate to obtain signature check original text having a user certificate signature; and a user signature original text sending module, configured to send the signature check original text having the user certificate signature to the certificate server, so as to check the user certificate.

In an implementation, the certificate application apparatus 800 can further include the following: a user input information submission module, configured to submit a device name and an input user identification code to the certificate server, where the input user identification code is used for user identity check during device certificate application, and the device name is used to identify a terminal device, where a device certificate that is applied for belongs to the terminal device; a certificate driver installation module, configured to obtain a driver installation file by using a received driver installation address, and install a certificate driver by using the driver installation file to obtain the device certificate and an encrypted key file that are packaged in the driver installation file; and a device certificate private key acquisition module, configured to decrypt the encrypted key file based on the submitted user identification code, to obtain a private key in a key pair of the device certificate.

In an implementation, the certificate application apparatus 800 can further include the following: a device certificate signing module, configured to digitally sign obtained device information by using the private key in the key pair of the device certificate, to obtain device activation information having a device certificate signature; a device activation information sending module, configured to send the device activation information to the certificate server, so as to activate the device certificate; and a mapping relationship establishment module, configured to establish a mapping relationship between a user identified by the user identification code and the device certificate.

In an implementation, the device name and the input user identification code are information submitted by the certificate server by using an information collection page of a browser, and the information collection page is generated by the certificate server when the browser needs to use a device certificate for service processing.

Figure 9:
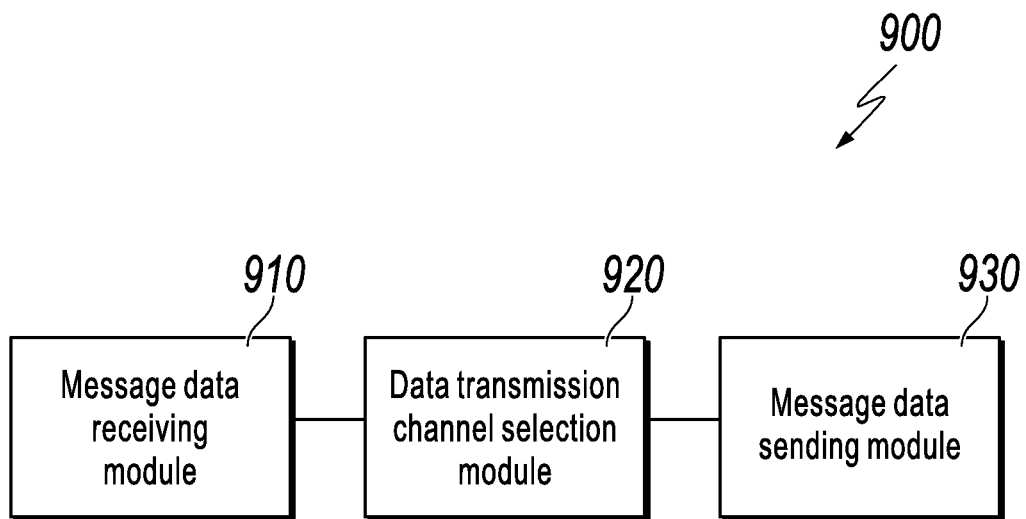
FIG. 9 is a schematic structural diagram illustrating a certificate application apparatus, according to an implementation of the present specification.

FIG. 9 is a schematic structural diagram illustrating a certificate application apparatus, according to an implementation of the present specification. As shown in FIG. 9, in an implementation, a certificate application apparatus 900 can include the following: a message data receiving module 910, configured to receive message data from a certificate server, where the message data includes a certificate installation instruction, a user certificate, or a user certificate signing instruction; a data transmission channel selection module 920, configured to determine a subscription topic name corresponding to the message data, and select a data transmission channel corresponding to the subscription topic name, where the data transmission channel is a channel established based on the subscription topic name sent by a terminal device to a gateway; and a message data sending module 930, configured to send the message data by using the data transmission channel.

In an implementation, the certificate application apparatus 900 can further include the following modules: a key receiving module, configured to receive a gateway key from the terminal device; a key verification module, configured to establish a link between the terminal device and the gateway when the gateway key is successfully verified; and a topic subscription module, configured to receive a device identification code and the subscription topic name, and establish the data transmission channel corresponding to the subscription topic name, where the device identification code is used to identify the terminal device.

In an implementation, the gateway supports a device communication protocol that is based on a publish topic and/or a subscription topic, and the device communication protocol includes the Message Queuing Telemetry Transport protocol.

In an implementation, the data transmission channel is a data transmission channel established based on the Message Queuing Telemetry Transport protocol.

Figure 10:
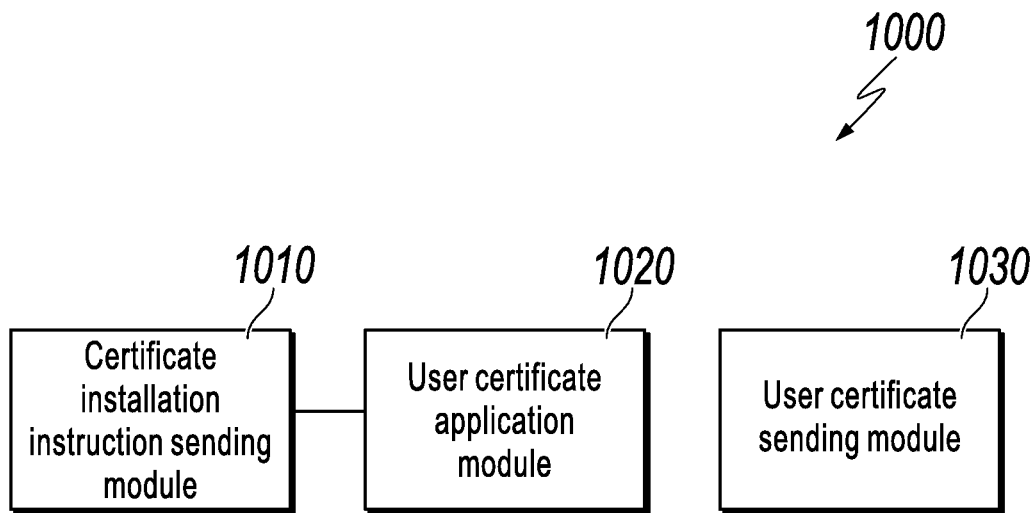
FIG. 10 is a schematic structural diagram illustrating a certificate application apparatus, according to another implementation of the present specification.

FIG. 10 is a schematic structural diagram illustrating a certificate application apparatus, according to another implementation of the present specification. As shown in FIG. 10, in an implementation, a certificate application apparatus 1000 can include the following: a certificate installation instruction sending module 1010, configured to send a certificate installation instruction to a gateway that pre-establishes a link, so that the gateway sends the certificate installation instruction to a terminal device by using a data transmission channel between the gateway and the terminal device, where the data transmission channel is a channel established based on a subscription topic name sent by the terminal device to the gateway, and message data corresponding to the subscription topic name includes the certificate installation instruction; a user certificate application module 1020, configured to receive a user certificate registration request corresponding to the certificate installation instruction, and apply for a user certificate based on the user certificate registration request; and a user certificate sending module 1030, configured to send the user certificate obtained through application to the gateway, so that the gateway sends the user certificate to the terminal device by using the data transmission channel.

In an implementation, the certificate installation instruction sending module 1010 can specifically include the following: a login user identification unit, configured to determine a device login user identified by a received user identification code; a device certificate key pair acquisition unit, configured to receive device identification information having a device certificate signature, and obtain a key pair of a device certificate corresponding to the device identification information; a device certificate signature verification unit, configured to verify the device certificate signature by using a public key in the key pair of the device certificate; a user identity information acquisition unit, configured to, if a verification result of the device certificate signature is a success, obtain identity information of the device login user from identity information of a user that has a mapping relationship with the device certificate; and a first user identity verification unit, configured to send the certificate installation instruction to the gateway when the identity information of the device login user is successfully verified.

In an implementation, the certificate application apparatus 1000 can further include the following: a gateway configuration information sending unit, configured to deliver gateway configuration information to the terminal device if the verification result of the device certificate signature is a success, so that the terminal device establishes the data transmission channel with the gateway based on the gateway configuration information.

In an implementation, the certificate application apparatus 1000 can further include the following: a user signature original text determining module, configured to determine signature check original text of the user certificate based on a received user certificate check request; a user signature encapsulated content determining module, configured to determine a device login user identified by a received user identification code, and obtain device identification information of a device that the device login user logs in to and a user certificate code of the device login user; a user signature instruction generation module, configured to encapsulate the signature check original text, the device identification information of the logged-in device, and the user certificate code to obtain a user certificate signing instruction, where the user certificate signing instruction is used to check the user certificate; and a user signature instruction sending module, configured to send the user certificate signing instruction to the gateway, so that the gateway sends the user certificate signing instruction to the terminal device by using the data transmission channel.

In an implementation, the certificate application apparatus 1000 can further include the following module: a user certificate signature verification module, configured to receive signature check original text having a user certificate signature, and verify the user certificate signature based on a public key in a key pair of the user certificate.

In an implementation, the certificate application apparatus 1000 can further include the following modules: a device certificate application module, configured to apply, based on a received device name and user identification code, for a device certificate for a terminal device corresponding to the device name, and determine a key pair of the device certificate; a certificate driver generation module, configured to generate a driver installation file of the device certificate by using a private key in the key pair of the device certificate, and send the driver installation file to the terminal device; a device signature verification module, configured to receive device activation information having a device certificate signature, and verify the device certificate signature by using a public key in the key pair of the device certificate; and a user-device binding module, configured to, when the device certificate signature is successfully verified, determine, based on the device activation information, that a login user identified by the user identification code is a user bound to the device certificate.

In an implementation, the device certificate application module can specifically include the following units: a second user identity verification unit, configured to determine a device login user identified by the received user identification code, and verify identity information of the device login user; a device certificate key pair generation unit, configured to, when the identity information of the device login user is successfully verified, generate a key pair used to apply for the device certificate; a device certificate request unit, configured to generate a device certificate request based on a public key in the key pair used to apply for the device certificate, the device name, and the identity information of the device login user, so as to apply for the device certificate based on the device certificate request; and a device certificate key pair determining unit, configured to use a key pair of the device certificate obtained through application as the key pair of the device certificate.

In an implementation, the certificate driver generation module can specifically include the following units: a device certificate private key encryption unit, configured to encrypt the private key in the key pair of the device certificate by using a specified key encryption method, to obtain an encrypted key file; and a certificate driver file packaging unit, configured to package the device certificate and the encrypted key file to obtain the driver installation file of the device certificate.

In an implementation, the device certificate private key encryption unit can further be specifically configured to encrypt the private key in the key pair of the device certificate by using a white-box encryption technology and by using the user identification code as a static encryption key, to obtain the encrypted key file.

It should be noted that the present specification is not limited to the specific configuration and processing described in the previous implementations and illustrated in the figures. For ease and brevity of description, a detailed description of a known method is omitted here. For a specific working process of the described system, module, and unit, reference can be made to corresponding processes in the previous method implementations, and details are omitted here for simplicity.

Figure 11:
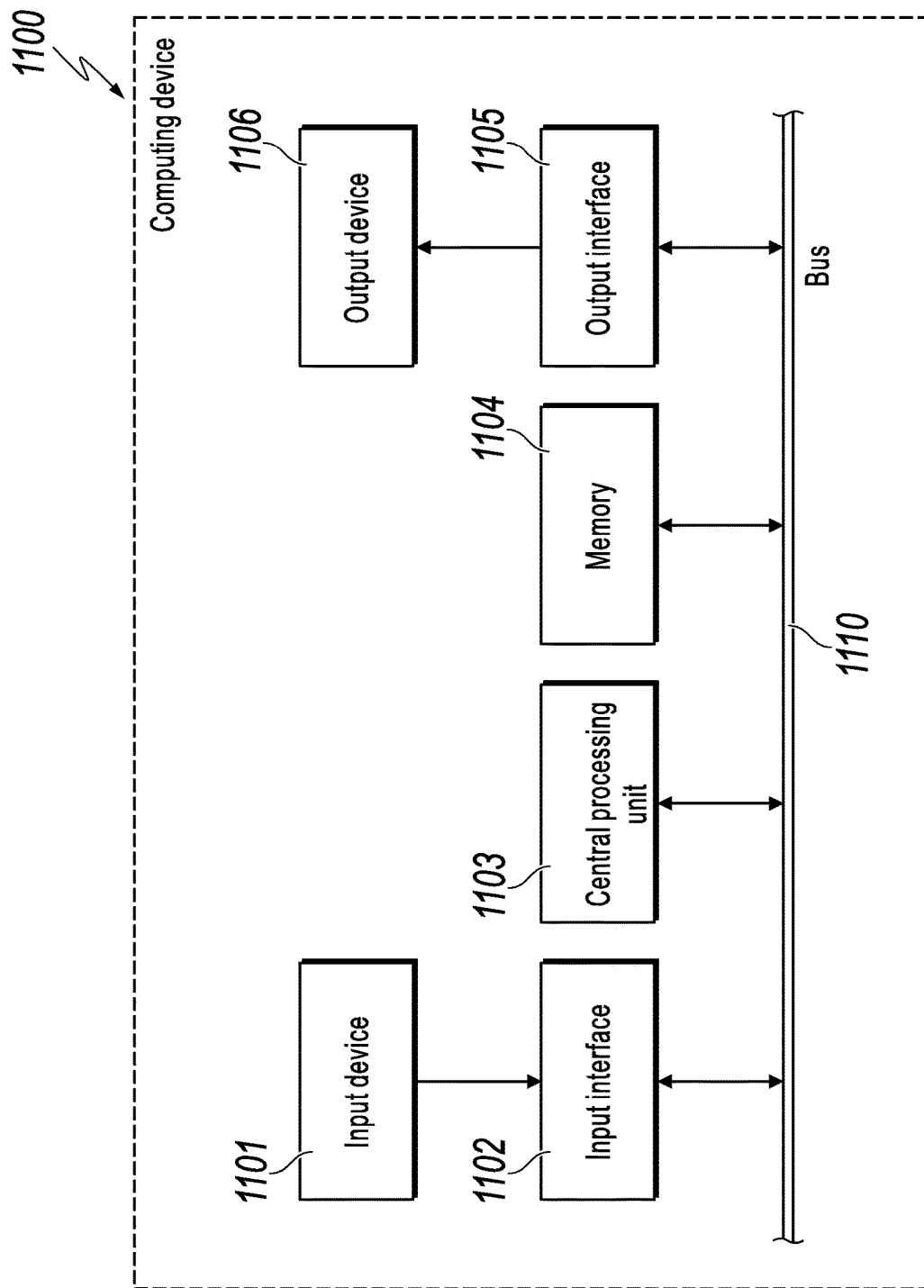
FIG. 11 is a structural diagram illustrating an example hardware architecture that can implement a computing device according to an implementation of the present specification.

FIG. 11 is a structural diagram illustrating an example hardware architecture that can implement a computing device according to an implementation of the present specification.

As shown in FIG. 11, a computing device 1100 includes an input device 1101, an input interface 1102, a central processing unit 1103, a memory 1104, an output interface 1105, and an output device 1106. The input interface 1102, the central processing unit 1103, the memory 1104, and the output interface 1105 are connected to each other by using a bus 1110, and the input device 1101 and the output device 1106 are separately connected to the bus 1110 by using the input interface 1102 and the output interface 1105, so as to be connected to other components of the computing device 1100. Specifically, the input device 1101 receives input information from the outside, and transmits the input information to the central processing unit 1103 by using the input interface 1102. The central processing unit 1103 processes the input information based on a computer executable instruction stored in the memory 1104 to generate output information, temporarily or permanently stores the output information in the memory 1104, and then transmits the output information to the output device 1106 by using the output interface 1105. The output device 1106 outputs the output information to the outside of the computing device 1100 for use by a user.

In an implementation, the computing device 1100 shown in FIG. 11 can be implemented as a terminal device. The terminal device can include a memory, configured to store a program; and a processor, configured to run the program stored in the memory, so as to execute the certificate application method applied to a terminal device described in the previous implementation.

In an implementation, the computing device 1100 shown in FIG. 11 can be implemented as a gateway device. The gateway device can include a memory, configured to store a program; and a processor, configured to run the program stored in the memory, so as to execute the certificate application method applied to a gateway described in the previous implementation.

In an implementation, the computing device 1100 shown in FIG. 11 can be implemented as a certificate server. The certificate server can include a memory, configured to store a program; and a processor, configured to run the program stored in the memory, so as to execute the certificate application method applied to a certificate server described in the previous implementation.

The previously described apparatus implementation is merely an example. The units described as separate parts can or cannot be physically separate, and parts displayed as units can or cannot be physical units, can be located in one position, or can be distributed on a plurality of network units. Some or all the modules can be selected according to actual needs to achieve the objectives of the solutions of the implementations. A person of ordinary skill in the art can understand and implement the implementations of the present specification without creative efforts.

Specific implementations of the present specification are described above. Other implementations fall within the scope of the appended claims. In some situations, the actions or steps described in the claims can be performed in an order different from the order in the implementations and the desired results can still be achieved. In addition, the process depicted in the accompanying drawings does not necessarily need a particular execution order to achieve the desired results. In some implementations, multi-tasking and concurrent processing is feasible or can be advantageous.

What is claimed is:

1. A computer-implemented method, comprising:
receiving, from a certificate server, gateway configuration information, wherein the gateway configuration information comprises a device identification code to identify a terminal device, and comprises a gateway key, a gateway address, and a subscription topic name;

establishing a link between the terminal device and a gateway based on the gateway key and the gateway address;

sending, from the terminal device, the device identification code and the subscription topic name to the gateway, so as to establish a data transmission channel between the terminal device and the gateway, the data transmission channel corresponding to the subscription topic name, wherein the data transmission channel is used to transmit, to the terminal device, message data corresponding to the subscription topic name;

receiving by the terminal device, via the data transmission channel, a certificate installation instruction from the certificate server;

generating, by the terminal device, a user certificate request based on the certificate installation instruction;

sending the user certificate request to the certificate server; and receiving, via the data transmission channel, a user certificate from the certificate server.

2. The computer-implemented method of claim 1, wherein the certificate installation instruction is generated by the certificate server based on a service type of a service requested by a receiving browser that runs on the terminal device.

3. The computer-implemented method of claim 1, wherein the data transmission channel is established based on a Message Queuing Telemetry Transport protocol.

4. The computer-implemented method of claim 1, wherein generating the user certificate request based on the certificate installation instruction comprises:

obtaining pushed content in the certificate installation instruction, wherein the pushed content comprises a pushed content challenge code, verified certificate principal information, and algorithm information;

generating a user certificate key pair by using the algorithm information, and digitally signing a public key in the user certificate key pair by using a private key in the user certificate key pair to obtain a public key having a user certificate signature; and encapsulating the public key having the user certificate signature and the verified certificate principal information to generate the user certificate request.

5. The computer-implemented method of claim 1, further comprising:

receiving, by the terminal device, a user certificate signing instruction by using the data transmission channel between the terminal device and the gateway, and obtaining signature check original text, the device identification code, and a user certificate code in the user certificate signing instruction;

selecting, by the terminal device, the user certificate corresponding to the user certificate code on the terminal device having the device identification code, and signing the signature check original text by using a private key in a key pair of the user certificate to obtain signature check original text having a user certificate signature; and sending, by the terminal device, the signature check original text having the user certificate signature for receipt by the certificate server.

6. The computer-implemented method of claim 1, further comprising:

submitting, by the terminal device, a device name and a user identification code for receipt by the certificate server, wherein the user identification code is used for a user identity check during a device certificate application, and the device name is used to identify the terminal device, wherein a device certificate that is being applied for belongs to the terminal device;

obtaining, by the terminal device, a driver installation file by using a received driver installation address, and installing a certificate driver by using the driver installation file to obtain the device certificate and an encrypted key file that are packaged in the driver installation file; and decrypting, by the terminal device, the encrypted key file based on the user identification code, to obtain a private key in a key pair of the device certificate.

7. The computer-implemented method of claim 6, further comprising:

digitally signing, by the terminal device, obtained device information by using the private key in the key pair of the device certificate, to obtain device activation information having a device certificate signature;

sending, by the terminal device, the device activation information for receipt by the certificate server, so as to activate the device certificate; and establishing, by the terminal device, a mapping relationship between a user identified by the user identification code and the device certificate.

8. A non-transitory, computer-readable medium storing one or more instructions executable by a computer system to perform operations comprising:

receiving, from a certificate server, gateway configuration information, wherein the gateway configuration information comprises a device identification code to identify a terminal device, and comprises a gateway key, a gateway address, and a subscription topic name;

establishing a link between the terminal device and a gateway based on the gateway key and the gateway address;

sending, from the terminal device, the device identification code and the subscription topic name to the gateway, so as to establish a data transmission channel between the terminal device and the gateway, the data transmission channel corresponding to the subscription topic name, wherein the data transmission channel is used to transmit, to the terminal device, message data corresponding to the subscription topic name;

receiving by the terminal device, via the data transmission channel, a certificate installation instruction from the certificate server;

generating, by the terminal device, a user certificate request based on the certificate installation instruction;

sending the user certificate request to the certificate server; and receiving, via the data transmission channel, a user certificate from the certificate server.

9. The computer-readable medium of claim 8, wherein the certificate installation instruction is generated by the certificate server based on a service type of a service requested by a receiving browser that runs on the terminal device.

10. The computer-readable medium of claim 8, wherein the data transmission channel is established based on a Message Queuing Telemetry Transport protocol.

11. The computer-readable medium of claim 8, wherein generating the user certificate request based on the certificate installation instruction comprises:

obtaining pushed content in the certificate installation instruction, wherein the pushed content comprises a pushed content challenge code, verified certificate principal information, and algorithm information;

generating a user certificate key pair by using the algorithm information, and digitally signing a public key in the user certificate key pair by using a private key in the user certificate key pair to obtain a public key having a user certificate signature; and encapsulating the public key having the user certificate signature and the verified certificate principal information to generate the user certificate request.

12. The computer-readable medium of claim 8, the operations further comprising:

receiving, by the terminal device, a user certificate signing instruction by using the data transmission channel between the terminal device and the gateway, and obtaining signature check original text, the device identification code, and a user certificate code in the user certificate signing instruction;

selecting, by the terminal device, the user certificate corresponding to the user certificate code on the terminal device having the device identification code, and signing the signature check original text by using a private key in a key pair of the user certificate to obtain signature check original text having a user certificate signature; and sending, by the terminal device, the signature check original text having the user certificate signature for receipt by the certificate server.

13. The computer-readable medium of claim 8, the operations further comprising:

submitting, by the terminal device, a device name and a user identification code for receipt by the certificate server, wherein the user identification code is used for a user identity check during a device certificate application, and the device name is used to identify the terminal device, wherein a device certificate that is being applied for belongs to the terminal device;

obtaining, by the terminal device, a driver installation file by using a received driver installation address, and installing a certificate driver by using the driver installation file to obtain the device certificate and an encrypted key file that are packaged in the driver installation file; and decrypting, by the terminal device, the encrypted key file based on the user identification code, to obtain a private key in a key pair of the device certificate.

14. The computer-readable medium of claim 13, the operations further comprising:

digitally signing, by the terminal device, obtained device information by using the private key in the key pair of the device certificate, to obtain device activation information having a device certificate signature;

sending, by the terminal device, the device activation information for receipt by the certificate server, so as to activate the device certificate; and establishing, by the terminal device, a mapping relationship between a user identified by the user identification code and the device certificate.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, from a certificate server, gateway configuration information, wherein the gateway configuration information comprises a device identification code to identify a terminal device, and comprises a gateway key, a gateway address, and a subscription topic name;

establishing a link between the terminal device and a gateway based on the gateway key and the gateway address;

sending, from the terminal device, the device identification code and the subscription topic name to the gateway, so as to establish a data transmission channel between the terminal device and the gateway, the data transmission channel corresponding to the subscription topic name, wherein the data transmission channel is used to transmit, to the terminal device, message data corresponding to the subscription topic name;

receiving by the terminal device, via the data transmission channel, a certificate installation instruction from the certificate server;

generating, by the terminal device, a user certificate request based on the certificate installation instruction;

sending the user certificate request to the certificate server; and receiving, via the data transmission channel, a user certificate from the certificate server.

16. The computer-implemented system of claim 15, wherein the certificate installation instruction is generated by the certificate server based on a service type of a service requested by a receiving browser that runs on the terminal device.

17. The computer-implemented system of claim 15, wherein the data transmission channel is established based on a Message Queuing Telemetry Transport protocol.

18. The computer-implemented system of claim 15, wherein generating the user certificate request based on the certificate installation instruction comprises:

obtaining pushed content in the certificate installation instruction, wherein the pushed content comprises a pushed content challenge code, verified certificate principal information, and algorithm information;

generating a user certificate key pair by using the algorithm information, and digitally signing a public key in the user certificate key pair by using a private key in the user certificate key pair to obtain a public key having a user certificate signature; and encapsulating the public key having the user certificate signature and the verified certificate principal information to generate the user certificate request.

19. The computer-implemented system of claim 15, the operations further comprising:

receiving, by the terminal device, a user certificate signing instruction by using the data transmission channel between the terminal device and the gateway, and obtaining signature check original text, the device identification code, and a user certificate code in the user certificate signing instruction;

selecting, by the terminal device, the user certificate corresponding to the user certificate code on the terminal device having the device identification code, and signing the signature check original text by using a private key in a key pair of the user certificate to obtain signature check original text having a user certificate signature; and sending, by the terminal device, the signature check original text having the user certificate signature for receipt by the certificate server.

20. The computer-implemented system of claim 15, the operations further comprising:

submitting, by the terminal device, a device name and a user identification code for receipt by the certificate server, wherein the user identification code is used for a user identity check during a device certificate application, and the device name is used to identify the terminal device, wherein a device certificate that is being applied for belongs to the terminal device;

obtaining, by the terminal device, a driver installation file by using a received driver installation address, and installing a certificate driver by using the driver installation file to obtain the device certificate and an encrypted key file that are packaged in the driver installation file; and decrypting, by the terminal device, the encrypted key file based on the user identification code, to obtain a private key in a key pair of the device certificate.

21. The computer-implemented system of claim 20, the operations further comprising:

digitally signing, by the terminal device, obtained device information by using the private key in the key pair of the device certificate, to obtain device activation information having a device certificate signature;

sending, by the terminal device, the device activation information for receipt by the certificate server, so as to activate the device certificate; and establishing, by the terminal device, a mapping relationship between a user identified by the user identification code and the device certificate.

* * * * *